US012801698B2

(12) United States Patent
Dalcher

(10) Patent No.: US 12,801,698 B2
(45) Date of Patent: Nov. 17, 2026

(54) METHOD AND APPARATUS FOR SCANNING A DIGITAL DATASET ACCESSIBLE TO A COMPUTING SYSTEM

(71) Applicant: Crowdstrike, Inc., Sunnyvale, CA (US)

(72) Inventor: Greg Dalcher, Casper, WY (US)

(73) Assignee: Crowdstrike, Inc., Sunnyvale, CA (US)

( * ) Notice: Subject to any disclaimer, the term of this patent is extended or adjusted under 35 U.S.C. 154(b) by 0 days.

(21) Appl. No.: 19/057,872

(22) Filed: Feb. 19, 2025

(65) Prior Publication Data

US 2026/0244712 A1 Aug. 20, 2026

(51) Int. Cl.
*G06F 18/22* (2023.01)
*G06F 16/22* (2019.01)

(52) U.S. Cl.
CPC .......... *G06F 18/22* (2023.01); *G06F 16/2246* (2019.01)

(58) Field of Classification Search
CPC ............................. G06F 18/22; G06F 16/2246
See application file for complete search history.

(56) References Cited

U.S. PATENT DOCUMENTS 10,963,473 B2 * 3/2021 Sakurai ................. G06F 16/285
11,055,351 B1 * 7/2021 Shyu ................... G06F 16/2379
12,056,137 B2 * 8/2024 Adams ................ G06F 16/2465
12,149,607 B2 * 11/2024 Adir ........................ H04L 9/008
2009/0293114 A1 * 11/2009 Mustafa .............. H04L 63/0227 726/13
2016/0247077 A1 * 8/2016 Singhal ................... G06F 16/26
2018/0107695 A1 * 4/2018 Yang ................... G06F 16/2465
2022/0229823 A1 * 7/2022 Pu .......................... G06F 16/215
2023/0108124 A1 * 4/2023 Sharangpani ......... G06F 16/283 707/693
2023/0214389 A1 7/2023 Trainin et al.
2023/0334362 A1 * 10/2023 Damo .................... G06N 20/00
2024/0362246 A1 * 10/2024 Kannan .................. G06N 20/00
2025/0110943 A1 * 4/2025 Miller .................... G06N 3/045
2025/0139202 A1 * 5/2025 Kruempelmann ...... G06F 16/22
2025/0181602 A1 * 6/2025 Khan ...................... G06F 16/27
2025/0298858 A1 * 9/2025 Smith ..................... G06F 17/11
2025/0335153 A1 * 10/2025 Brothers, III ............. G06F 7/20

OTHER PUBLICATIONS

Li, Y. et al., "BitWeaving: fast scans for main memory data processing," Proceedings of the 2013 ACM SIGMOD International Conference on Management of Data, 2013, pp. 289-300.
Miller, K.. et al., "KSM++: Using I/O-based hints to make memory-deduplication scanners more efficient," Proceedings of the ASPLOS Workshop on Runtime Environments, Systems, Layering and Virtualized Environments (RESoLVE '12), 2012, 9 pages.

* cited by examiner

*Primary Examiner* — Huawen A Peng
(74) *Attorney, Agent, or Firm* — Elliott, Ostrander & Preston, P.C.

(57) ABSTRACT

A computing system iteratively executes logic to select a portion of a dataset, select a data pattern from a plurality of data patterns, and then compare the selected portion of the dataset with the selected data pattern. A subsequent iteration of executing the logic selects the portion of the dataset and selects the data pattern based on a match that occurs between a previously selected portion of the dataset and a previously selected data pattern in a previous iteration of executing the logic to compare the previously selected portion of the dataset with the previously selected data pattern.

20 Claims, 4 Drawing Sheets

METHOD AND APPARATUS FOR SCANNING A DIGITAL DATASET ACCESSIBLE TO A COMPUTING SYSTEM

COPYRIGHT NOTICE

A portion of this disclosure contains material which is subject to copyright protection. The copyright owner has no objection to the facsimile reproduction by anyone of the disclosure as it appears in the Patent and Trademark Office patent file or records, but otherwise reserves all copyright rights whatsoever.

TECHNICAL FIELD

Embodiments relate to digital data scanning techniques, for example, computer memory scanning techniques.

BACKGROUND

Cybersecurity service providers may introduce accelerated memory scanning into sensors residing on endpoint, end user, or client computing, devices for Windows to enhance existing visibility and detection of fileless threats. Such a sensor may integrate Intel® Threat Detection Technology (Intel® TDT) to perform accelerated memory scanning for malicious byte patterns. Memory scanning may be optimized for performance on Intel CPUs, including high-performance operation, by offloading the operation to an available Intel integrated graphics processing unit (GPU).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
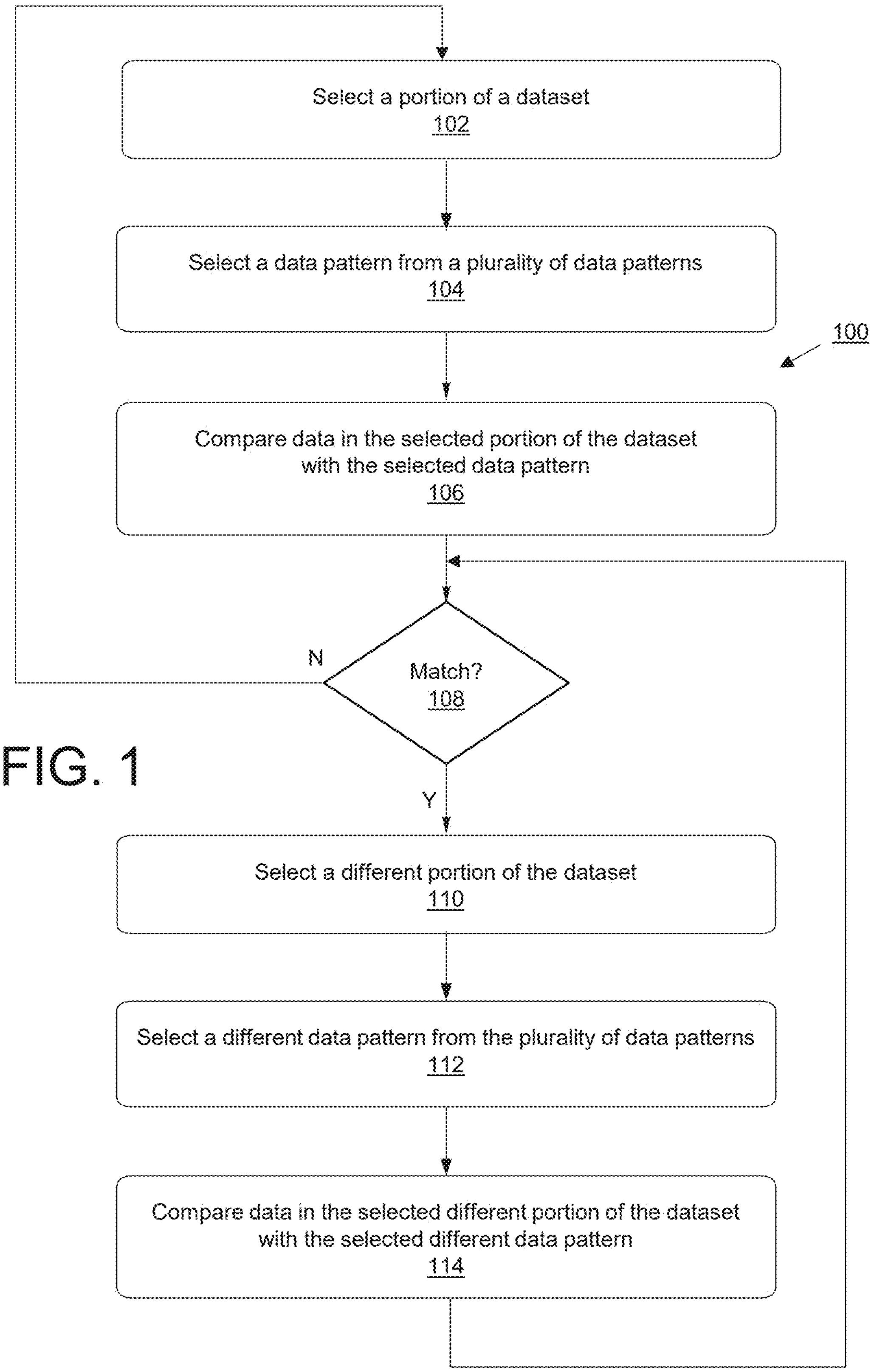
FIG. 1 is a flowchart of aspects of a computer-implemented method according to an embodiment of the invention.

Cybersecurity service providers may integrate Intel Threat Detection Technology (TDT) accelerated memory scanning into a sensor for Windows to increase visibility and detect in-memory threats, adding another layer of protection against fileless threats. In recent years, threat actors have increased their dependence on fileless or malware-free attacks. One recent report noted that 62% of all attacks in the fourth quarter of 2021 were malware-free, with attackers relying instead on built-in tools and code injection techniques to accomplish their goals without dropping a malicious binary to disk.

Memory scanning augments the coverage of a sensor in detecting fileless threats, extending the protection already provided by Script Control and behavioral indicators of attack (IOAs). The memory scanning technology allows the sensor to search through large amounts of process memory in a highly performant way, looking for malicious patterns indicative of a fileless attack. The memory scanning engine may integrate Intel Threat Detection Technology accelerated memory scanning (AMS) into the sensor. Intel TDT AMS optimizes performance on Intel CPUs and offloads computation to the Intel integrated graphics processing unit (iGPU) when present. With high-performance scans, more memory can be scanned more often to find artifacts of malicious intrusion.

The dominant feature of fileless attacks, more accurately termed "executable-less attacks," is that such attacks do not drop traditional malware or a malicious executable file to disk. A fileless attack may rely on other types of files, such as weaponized document files, to achieve initial access, or on scripts (sometimes encrypted or encoded) to aid in execution. However, it is carried out without an executable file to scan; the attack itself is carried out entirely in memory.

Initial access is often achieved through the same techniques as executable-based attacks, such as browser or application exploits or phishing and social engineering attacks. Once a foothold is gained, fileless attacks need to find novel ways to execute malicious code and gain persistence. Execution of malicious logic and lateral movement is often carried out by "dual-use" applications, also called "living off the land" binaries or "LOLbins." These dual-use attacks use legitimate applications, scripts and administrative tools to accomplish their malicious purpose. LOLbins include both native applications and scripting tools like PowerShell, MSHTA, Windows Management Instrumentation (WMI), regsvr32 and Task Scheduler. These tools and techniques were used in fileless attacks including Cobalt Strike malware, the Helminth Trojan and PoshSpy.

Execution may alternatively be carried out by code injection attacks, whereby, for example, shellcode injection or reflective Dynamic Link Library (DLL) loading is used to run code in either the compromised process or a remote process. Cobalt Strike malware, Kovter and NotPetya are known to use code injection, reflective loading or process hollowing to achieve malicious execution.

By not dropping and executing a malicious binary itself, fileless attacks need to find other ways to gain persistence. Persistence requires both a location to store code or data and a means to trigger malicious code or script launch. Dropping scripts, storing malicious code or scripts in the registry, or using LOLbins like Windows Management Instrumentation (WMI) or Task Scheduler are all strategies to achieve persistence. These techniques are associated with in-the-wild activity for Poweliks and Kovter malware, PoshSpy attacks and the Helminth backdoor.

Each of these stages (initial access, execution and persistence) leaves behind unique and revealing artifacts of intrusion in memory. While memory scanning is already a valuable forensics tool, it does not need to be limited to post-breach incident responses—it can be used to detect attacks in progress.

Historically, there has been a substantial impact on CPU performance when scanning memory, limiting its ability to be used broadly for attack detection. One way to better meet the threat of fileless attacks is to integrate Intel's TDT AMS into a sensor. With Intel TDT AMS, the sensor can scan large swaths of a program's virtual memory looking for artifacts of a malicious intrusion.

From exploitation to execution and impact, the cybersecurity platform can identify and protect against fileless attacks through behavioral IOAs composed of data from features like Script Control, Call Stack Analysis and Additional User Mode Data. Memory scanning can plug into the system of events and behaviors on the cybersecurity platform, providing an improved level of visibility and protection.

Byte pattern memory scanning, or, simply, memory scanning, can identify a process of interest (a "target process") and iterate through its memory space to identify malicious artifacts. These artifacts could include shellcode patterns, unique strings or malicious patches.

A memory scan is defined by, for example, high-fidelity pattern specifications and rules around when and where the scan for those patterns should be performed. A triggering mechanism describes either a routine or potentially suspicious circumstance when the memory scan should be initiated. The memory pattern specification describes the pattern itself, e.g., a particular malicious byte code pattern, and provides optional hints as to the type of memory in which the pattern may be found. For example, shellcode might only be expected to fall in executable memory, but unique strings in read-only memory. These memory description down-selects provide both a performance and a precision benefit. Only the necessary memory is scanned and evaluated, which saves cycles and improves efficacy by allowing for more precise specifications.

When a memory pattern scan is initiated, the memory scan component acquires the specified portions or chunks of memory from the target process into the scanning process. In one embodiment, the scanning process may be run as a secure container on the endpoint, end user, or client computing, device. Once the portion of memory has been acquired, the scanning process iterates through the portion of memory using a pattern-matching algorithm, which, according to an embodiment, may be optimized to run as a massively parallelized workload.

Traditionally both a CPU and time-intensive operation, memory scanning can be made feasible through optimizations at all levels of a design to prioritize performance, resulting in a pattern-matching algorithm that is optimized for execution on specific hardware or logic such as multi- and many-core architectures. Design flexibility allows memory to be logically down-selected to only the portions or parts that matter for the scan, while guardrails on memory scan size and limits on CPU utilization may be used to limit the disruption to the system and the end user's experience. For example, an embodiment may take advantage of Intel TDT AMS to intelligently offload pattern-matching computations to an Intel integrated GPU when available, taking advantage of both the many-core GPU and the system-on-a-chip architecture with a shared memory controller.

Continuously escalated threats and the exploitation of zero-day vulnerabilities can only be stopped with a dynamic solution that can respond to new threats in real time. Detection of fileless attacks starts from the same point as detection of traditional malware-based attacks. For example, a cybersecurity service provider's reverse engineers, research and response teams, and cybersecurity threat hunting teams may analyze real-world data and in-the-wild malicious scripts and tools 24 hours a day. Using their research and leveraging the dynamic content updates of the cybersecurity platform, a cybersecurity service provider's rapid response teams can deploy new behavioral IOAs at any time. With the addition of memory scanning to the sensor, these rapid response teams can release new memory pattern specifications and rules from the cloud to the cybersecurity service provider's customer endpoints within minutes.

As noted above, there is a substantial impact on CPU performance when scanning memory, limiting its ability to be used broadly for attack detection. Deep learning analysis, even with acceleration and offload from the CPU, such as with a Neural Processing Unit (NPU), may be too slow to analyze parts or all of process memory, for even a single process, let alone multiple processes. What is needed is a method to pre-scan memory regions to determine if any subsets or portions thereof warrant further analysis, including, for example, deep learning analysis. Such a pre-scan process can select relevant segments or portions of memory for such further analysis, while not overburdening the system, and the CPU in particular, with the process.

According to an embodiment, the pre-scan process performs a multi-pass screening of a block of memory. As described in further detail below, each scanning pass is optimized to down-select from the block to minimize subsets of the block for subsequent passes. In a given pass, a set of patterns is used to check for matches within the block. If a pattern matches, the match location is noted for re-analysis in a subsequent pass and the pattern that matched is also noted. The pattern that matches a portion of the memory region determines the set of patterns to be used for a subsequent pass at the match location. According to an embodiment, operation of the pre-scan process may benefit from using a trained algorithm, termed a "trained model", or simply "model" herein.

According to an embodiment, the trained model contains a tree data structure that contains all the patterns to match against a memory region. Each pattern functions as a node in the tree data structure. A parent node is connected by respective edges to child nodes that contain the patterns to use in subsequent searches should the pattern in the parent node match data in a location in the memory region.

If a pattern matches, the node in the tree data structure that contains that pattern becomes the parent node for the subsequent pass and the patterns in its child nodes are used in subsequent matches. The match location in the memory region is used as a starting point for the next match query pass, for example, moving forward and backwards in memory from that location. Match query passes iterate downward in the tree, for example, to a leaf node. If the leaf node indicates (for example, in its metadata) the match is deemed sufficient to warrant further analysis, the memory region may be further analyzed with a deep learning algorithm. At any given pass (depth in the tree), multiple patterns may match against the same memory region, each match resulting in downwards traversals of subsequent query passes.

According to an embodiment, the model may be trained with a set of labeled byte streams that the deep learning model will train against. These streams may be a set of byte injection payloads in an application to identify byte injection in memory regions. In one embodiment, the training selects and arranges the patterns, using statistical analysis, so that the patterns are organized in a way that optimizes passes through the tree, so the process can quickly winnow down memory regions for subsequent passes and ultimately begin the analysis by the deep learning model. According to an embodiment, patterns may consist of single or multiple bytes or characters. Training may be used to assemble the tree-based hierarchy. Each node contains a list of patterns to match against. Each pattern itself acts as the tip of a subtree. The output of the training is used to build the tree accordingly. According to an embodiment, the training selects and arranges the patterns in the tree depending on the application-specific use for or consumer of the pattern-matching process.

The matching algorithm works its way through each level of the tree based on what patterns match at a current node in the tree, gathers the noted patterns for that node, repeats the matching query with these patterns, and so on. According to an embodiment, the tree is optimized to not find matches, thereby quickly reducing the number of subsequent match queries to be performed for a given block of memory and reducing to a minimum the areas of the block that remain for deep learning analysis.

Figure 2:
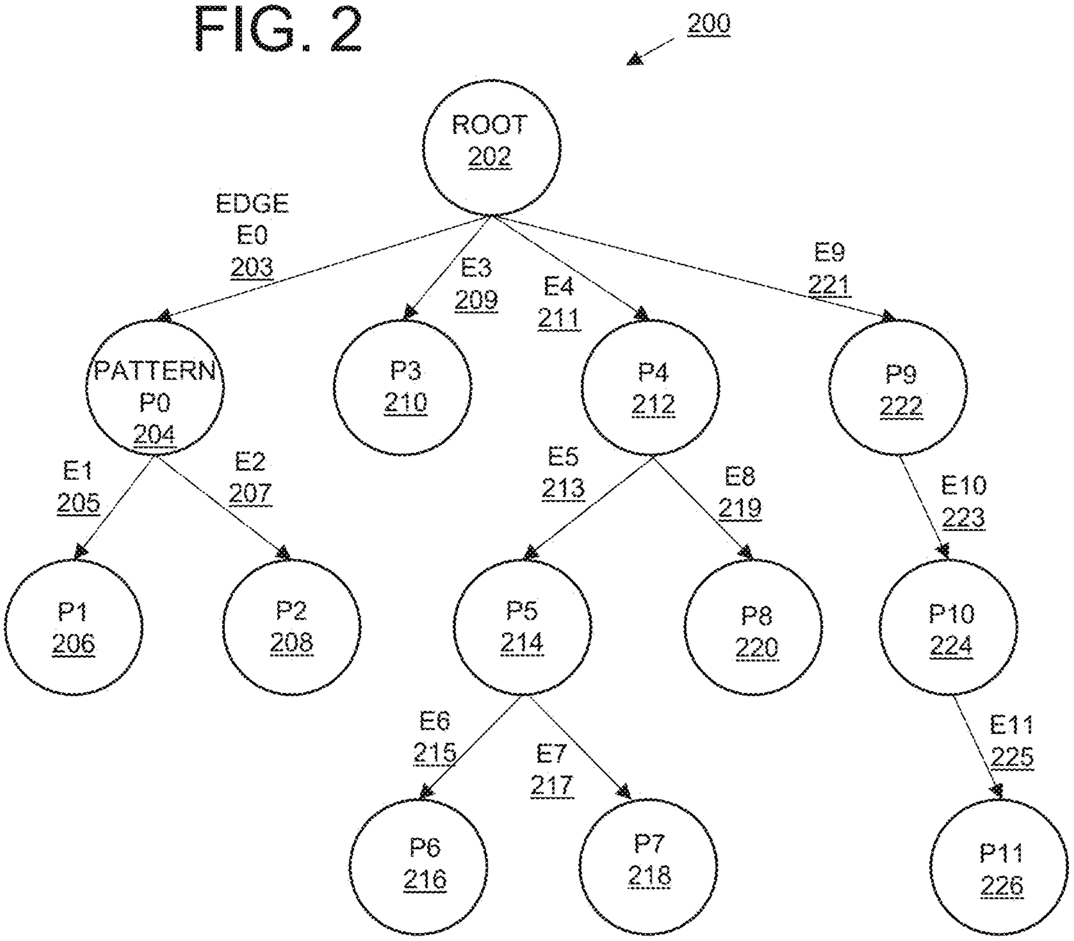
FIG. 2 is a tree data structure that may be used to store data patterns in accordance with embodiments of the invention.
Figure 3:
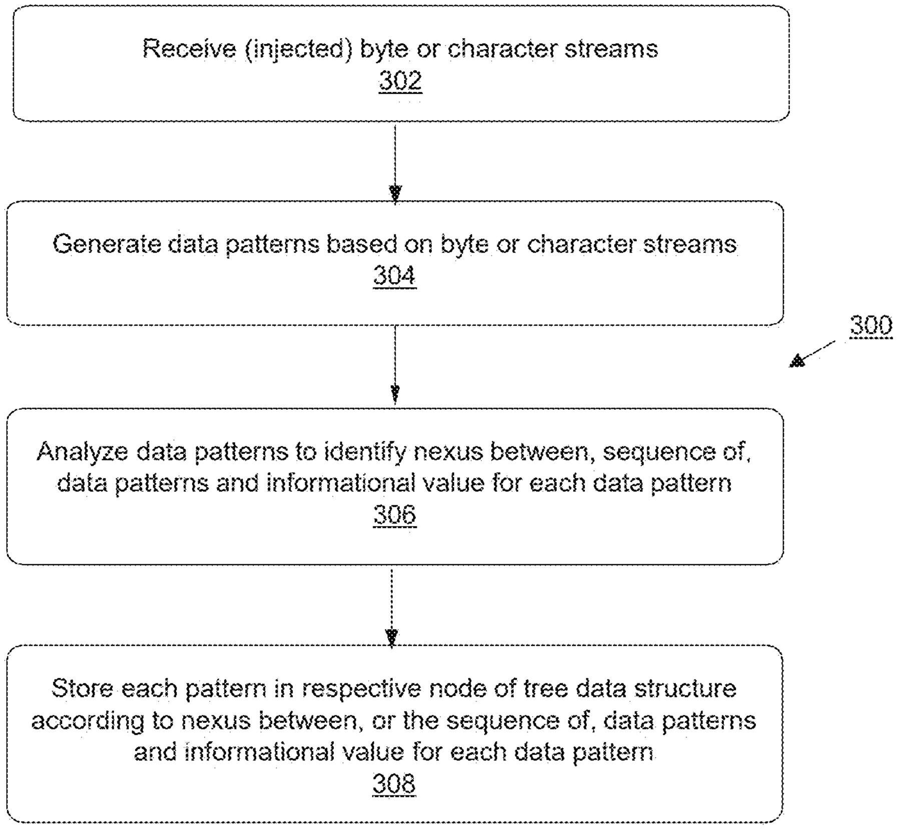
FIG. 3 is a flowchart of aspects of a computer-implemented method according to an embodiment of the invention.

With reference to FIGS. 1-3, a more detailed discussion follows regarding the pre-scan process that performs a multi-pass screening of a block of memory according to the disclosed embodiments. The computer-implemented process may be performed by an endpoint, end-user, or client, computing device that has memory in which to store executable instructions and a processing unit to read and execute the instructions according to the computer-implemented process. The process 100 involves iteratively executing logic to select, at step 102, a portion of a dataset. In the above discussion, the dataset, for example, is a region of memory, such as a block of process memory. However, it is appreciated that the dataset could be any data that is to be analyzed. For example, the dataset may be a log file, and the selected portion of the dataset may be one or more records read from a log file, or the dataset may be streaming data, and the selected portion of the dataset may be data obtained from a buffer that receives the streaming data in real time, for example, via an internet browser or network connection.

The process continues at step 104 to select a data pattern from a plurality of data patterns with which to compare to the selected portion of the dataset. According to embodiments, executing logic selects as the data pattern a single byte or character from the plurality of data patterns, or the executing logic may select as the data pattern a number of bytes or characters from the plurality of data patterns.

At step 106, the selected portion of the dataset is compared with the selected data pattern. At step 108, the process determines whether the selected data pattern matches the selected portion of the dataset. If the selected data pattern does not match the selected portion of the dataset, the process returns to step 102, selecting a different portion of the dataset at step 102, then selecting the same or a different data pattern at step 104, and comparing at step 106 the newly selected portion of the dataset with the selected data pattern.

If, at step 108, if the process determines the selected data pattern matches the selected portion of the dataset, the process repeats, selecting at step 110 a different portion of the dataset, and then selecting, at step 112, a different data pattern from the plurality of data patterns with which to compare to the different portion of the dataset selected at step 110. At step 114, the selected different portion of the dataset is compared to the selected different data pattern. At step 108, the process determines whether the selected different data pattern matches the selected different portion of the dataset. If the selected different data pattern does not match the selected different portion of the dataset, the process returns to step 102, selecting yet another, different, portion of the dataset at step 102, then selecting the same or a different data pattern at step 104, and comparing at step 106 the newly selected portion of the dataset with the selected data pattern.

If, however, at step 108, the process determines that the selected different data pattern matches the selected different portion of the dataset, the process repeats steps 110, 112, 114 and 108 in the same manner, as described above until such time as the process decides sufficient iterations of the process have been performed, as discussed further below.

Thus, according to the disclosed embodiments, the iteratively executing logic that selects the portion of the dataset and selects the data pattern, involves a subsequent iteration of the executing logic that selects the portion of the dataset and selects the data pattern based on a match that occurs between a previously selected portion of the dataset and a previously selected data pattern in a previous iteration of the executing logic that compares the previously selected portion of the dataset with the previously selected data pattern.

With reference to FIG. 2, the executing logic stores the plurality of data patterns in a tree data structure 200, or, simply, tree 200. Each data pattern is stored in a respective node of the tree data structure. For example, tree data structure 200 illustrated in FIG. 2 includes a root node 202 connected to nodes 204, 210, 212 and 222 at a first level in the tree below the root node 202 via respective edges E0 203, E3 209, E4 211 and E9 221. Each such node respectively stores a different data pattern P0, P3, P4 and P9. Nodes 206, 208, 214, 220 and 224 exist at a second level in the tree and are connected via respective edges E1 205, E2 207, E5 213, E8 219 and E10 223 to one of the nodes in the first level in the tree. For example, node 204 in the first level of the tree is a parent node to child nodes 206 and 208 in the second level of the tree, whereas node 212 in the first level of the tree is a parent node to child nodes 214 and 220 in the second level of the tree. Each node 206, 208, 214, 220 and 224 respectively stores a different data pattern P1, P2, P5, P8 and P10. Finally, nodes 216, 218 and 226 exist at a third level in the tree and are connected via respective edges E6 215, E7 217 and E11 225 to one of the nodes in the second level in the tree. For example, node 214 in the second level of the tree is a parent node to child nodes 216 and 218 in the third level of the tree, whereas node 224 in the second level of the tree is a parent node to child node 226 in the third level of the tree. Each node 216, 218 and 226 respectively stores a different data pattern P6, P7 and P11. It is appreciated that the example tree illustrated in FIG. 2 is very small—there may be many more nodes on each level in the tree, and many more levels in the tree. While the above embodiment describes data itself stored in the nodes of tree 200, it is appreciated that the nodes may store pointers to the data, rather than the data itself, and the data patterns may be stored in a different data structure pointed to by pointers.

A node at a given level of the tree is connected by an edge to a node in a higher or lower level in the tree where there is some relationship or nexus between the respective data patterns stored in the connected nodes. For example, the data patterns in the respective nodes may be adjacent bytes or characters in a sequence of a byte or character stream or an injected byte stream. Thus, pattern P0 stored in node 204 and pattern P1 stored in node 206 are connected by edge E1 205, indicating there is a relationship between those two patterns.

Likewise pattern P0 stored in node 204 and pattern P2 stored in node 208 are connected by edge E2 207, indicating there is a relationship, nexus, or sequence involving those two patterns. Similar connections exist between nodes via edges E5 213, E6 215, E7 217, E8 219, E10 223 and E11 225.

Thus, each subsequent iteration of the executing logic selects a data pattern based on a match that occurs between the previously selected portion of the dataset and the previously selected data pattern in the previous iteration of the executing logic that compares the previously selected portion of the dataset with the previously selected data pattern, by selecting a data pattern stored in a child node of the tree based on a match that occurs between a previously selected portion of the dataset and a previously selected data pattern stored in a parent node of the tree that is connected by an edge to the child node, in a previous iteration of the executing logic that compares the previously selected portion of the dataset with the previously selected data pattern.

With reference to FIG. 3, according to an embodiment, a training model 300 generates the plurality of data patterns from a plurality of byte or character streams and/or a plurality of injected byte or character streams. These streams are fed at step 302 to the training model, which generates the data patterns therefrom at step 304. The training model then analyzes at step 306 the plurality of data patterns to identify a nexus between, or a sequence of, two or more data patterns and an informational value for each data pattern. This information is then used to store the data patterns in the tree at step 308. Each data pattern is stored in a respective node of the tree data structure according to the nexus between, or the sequence of, two or more data patterns and the informational value for each data pattern. The greater or higher the informational value of a data pattern, the higher up in the tree it is stored, so that the data pattern is encountered sooner in the pattern matching process, given its greater value or weight. The lesser or lower the informational value of a data pattern, the lower down in the tree it is stored, so that the data pattern is encountered later in the pattern matching process, if at all.

Thus, according to an embodiment, executing logic stores each pattern in the respective node of the tree data structure according to the nexus between, or the sequence of, two or more data patterns and the informational value for each data pattern, wherein the executing logic stores a data pattern with a higher informational value in a node at a higher level in the tree data structure and stores a data pattern with a lower informational value in a node at a lower level in the tree data structure. The logic connects with an edge the node at the higher level in the tree data structure with the node at the lower level in the tree data structure, where the data pattern stored in the node at the higher level in the tree data structure has an identified nexus, or is in an identified sequence, with the data pattern stored in the node at the lower level in the tree data structure.

According to an embodiment, the executing logic iteratively continues to compare a selected portion of the dataset with a selected data pattern until an iteration of the executing logic occurs that selects a data pattern stored in a leaf node of the tree data structure, or until a threshold number of matches occurs, somewhere far enough down through the tree, between the selected portion of the dataset and the selected data pattern over one or more iterations of the executing logic that compares the selected portion of the dataset with the selected data pattern.

According to an embodiment, the executing logic that selects the portion of the dataset includes a subsequent iteration of the executing logic that selects a previous/earlier or subsequent/later portion of the dataset relative to the selected portion of the dataset in a previous iteration of the executing logic, based on a match that occurs between the previously selected portion of the dataset and the previously selected data pattern in the previous iteration of the executing logic. For example, if the dataset is selected from a memory region, the earlier or later portion of the dataset may be selected from earlier or later location (address) in the memory region, relative to the location of the selected data pattern in the previous iteration. In an embodiment, the previous portion or a subsequent portion of the dataset may be located contiguous with or offset from the selected portion of the dataset in the previous iteration.

Figure 4:
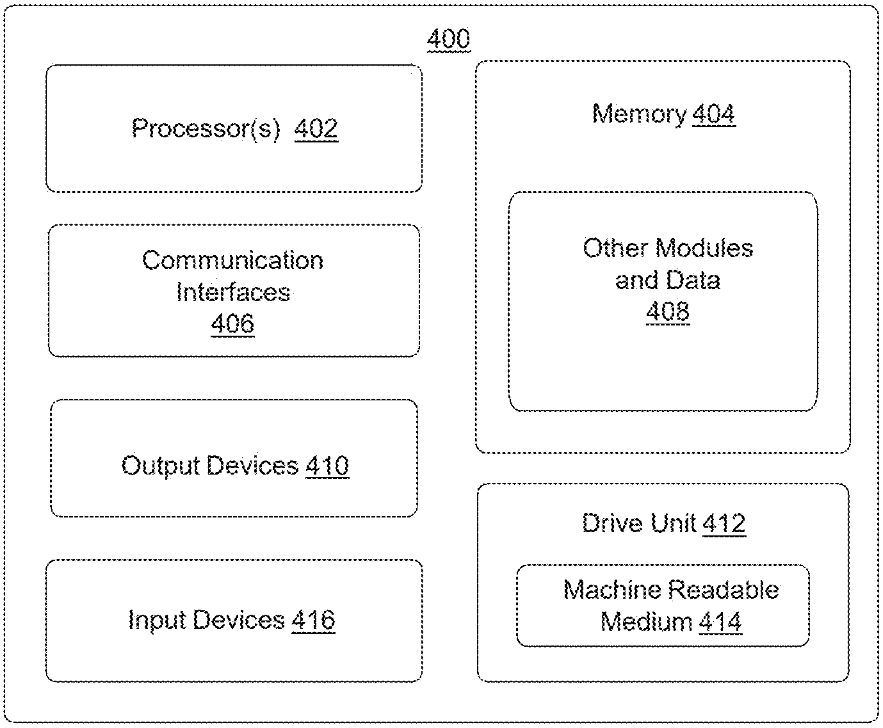
FIG. 4 illustrates an example architecture for a computing device capable of carrying out an embodiment of the invention.

FIG. 4 depicts an example architecture for a computing device 400 that can carry out embodiments of the invention. The computing device 400 can be one or more computing devices, such as a client computing device, a workstation, a personal computer (PC), a laptop computer, a tablet computer, a personal digital assistant (PDA), a cellular phone, a media center, an embedded system, a server or server farm, multiple distributed server farms, a mainframe, or any other type of computing device. As shown in FIG. 4, computing device 400 can include processor(s) 402, memory 404, communication interface(s) 406, output devices 410, input devices 416, and/or a drive unit 412 including a machine readable medium 414.

In various examples, the processor(s) 402 can be a central processing unit (CPU), a graphics processing unit (GPU), or both CPU and GPU, or any other type of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing drivers and other computer-executable instructions for applications, routines, or processes stored in the memory 404, which can be associated with common types of volatile (RAM) and/or nonvolatile (ROM) memory. In various examples, the memory 404 can include system memory, which may be volatile (such as RAM), non-volatile (such as ROM, flash memory, etc.) or some combination of the two. Memory 404 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 400. Any such non-transitory computer-readable media may be part of the computing device 400.

The memory 404 can store data, including computer-executable instructions. The memory 404 can also store any other modules and data 408 that can be utilized by the computing device 400 to perform or enable performing any action taken by the computing device 400 or in connection with one or more user accounts. For example, the modules and data can be a platform, operating system, and/or applications, as well as data utilized by the platform, operating system, and/or applications.

The communication interfaces 406 can link the computing device 400 to other elements through wired or wireless connections. For example, communication interfaces 406 can be wired networking interfaces, such as Ethernet interfaces or other wired data connections, or wireless data interfaces that include transceivers, modems, interfaces, antennas, and/or other components, such as a Wi-Fi interface. The communication interfaces 406 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the computing device 400 to send and/or receive data, with the communication interfaces 406.

The output devices 410 can include one or more types of output devices, such as speakers or a display, such as a liquid crystal display. Output devices 410 can also include ports for one or more peripheral devices, such as headphones, peripheral speakers, and/or a peripheral display. In some examples, a display can be a touch-sensitive display screen, which can also act as an input device 416.

The input devices 416 can include one or more types of input devices, such as a microphone, a keyboard or keypad, and/or a touch-sensitive display, such as the touch-sensitive display screen described above.

The drive unit 412 and machine readable medium 414 can store one or more sets of computer-executable instructions, such as software or firmware, that embodies any one or more of the methodologies or functions described herein. The computer-executable instructions can also reside, completely or at least partially, within the processor(s) 402, memory 404, and/or communication interface(s) 406 during execution thereof by the computing device 400. The processor(s) 402 and the memory 404 can also constitute machine readable media 414.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform functions or implement abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, performed by a client computing device having at least a memory in which to store executable instructions and a processing unit to read and execute the instructions according to the computer-implemented method, comprising:

iteratively executing logic to:

select a new portion of a dataset;

select a new data pattern from a plurality of data patterns; and compare the selected new portion of the dataset with the selected new data pattern;

wherein the iteratively executing logic to select the new portion of the dataset and select the new data pattern, comprises a subsequent iteration of the executing logic to select the new portion of the dataset and select the new data pattern based on a match that occurs between a previously selected different portion of the dataset and a previously selected different data pattern in a previous iteration of the executing logic to compare the previously selected different portion of the dataset with the previously selected different data pattern.

2. The computer-implemented method of claim 1, further comprising:

executing logic to store the plurality of data patterns in a tree data structure, in which each data pattern is stored in a respective node of the tree data structure; and wherein the subsequent iteration of the executing logic to select the new data pattern based on the match that occurs between the previously selected different portion of the dataset and the previously selected different data pattern in the previous iteration of the executing logic to compare the previously selected different portion of the dataset with the previously selected different data pattern, comprises the subsequent iteration of the executing logic to select a new data pattern stored in a child node of the tree data structure based on a match that occurs between a previously selected different portion of the dataset and a previously selected different data pattern stored in a parent node of the tree data structure, connected by an edge of the tree data structure to the child node, in a previous iteration of the executing logic to compare the previously selected different portion of the dataset with the previously selected different data pattern.

3. The computer-implemented method of claim 2, further comprising executing logic to:

generate the plurality of data patterns from one or both of a plurality of byte or character streams and a plurality of injected byte or character streams;

analyze the plurality of data patterns to identify a nexus between, or a sequence of, two or more data patterns and an informational value for each data pattern; and wherein executing logic to store the plurality of data patterns in the tree data structure, in which each data pattern is stored in a respective node of the tree data structure, comprises executing logic to store each pattern in a respective node of the tree data structure according to the nexus between, or the sequence of, two or more data patterns and the informational value for each data pattern.

4. The computer-implemented method of claim 3, wherein the executing logic to store each pattern in the respective node of the tree data structure according to the nexus between, or the sequence of, two or more data patterns and the informational value for each data pattern, comprises the executing logic to:

store a data pattern with a higher informational value in a node at a higher level in the tree data structure;

store a data pattern with a lower informational value in a node at a lower level in the tree data structure; and connect with an edge the node at the higher level in the tree data structure with the node at the lower level in the tree data structure, where the data pattern stored in the node at the higher level in the tree data structure has an identified nexus, or is in an identified sequence, with the data pattern stored in the node at the lower level in the tree data structure.

5. The computer-implemented method of claim 2, wherein iteratively executing logic to compare the selected new portion of the dataset with the selected new data pattern continues until one of an iteration of the executing logic occurs to select a new data pattern stored in a leaf node of the tree data structure, and a threshold number of matches occurs between the selected new portion of the dataset and the selected new data pattern over one or more iterations of the executing logic to compare the selected new portion of the dataset with the selected new data pattern.

6. The computer-implemented method of claim 1, wherein the executing logic to select the new portion of the dataset, comprises a subsequent iteration of the executing logic to select one of a previous new portion and a subsequent new portion of the dataset relative to the selected new portion of the dataset in a previous iteration of the executing logic to compare the selected new portion of the dataset with the selected new pattern based on the match that occurs between the previously selected different portion of the dataset and the previously selected different data pattern in the previous iteration of the executing logic to compare the previously selected different portion of the dataset with the previously selected different data pattern.

7. The computer-implemented method of claim 6, wherein the executing logic to select one of the previous new portion and the subsequent new portion of the dataset relative to the selected new portion of the dataset in the previous iteration, comprises executing logic to select one of a previous new portion and a subsequent new portion of the dataset that is located contiguous with or an offset from the selected new portion of the dataset in the previous iteration.

8. The computer-implemented method of claim 1, wherein executing logic to select the new data pattern from the plurality of data patterns comprising executing logic to select one of a new single byte or character and a new plurality of bytes or characters from the plurality of data patterns.

9. The method of claim 1, wherein iteratively executing logic further comprises executing logic to add data from the selected new portion of the dataset to a second dataset in response to a match that occurs when executing logic to compare the selected different portion of the dataset with the selected different data pattern.

10. A computer system, comprising:

a memory to store computer-executable instructions;

one or more processors to read from the memory and execute the instructions, comprising:

iteratively executing logic to:

select a new portion of a dataset;

select a new data pattern from a plurality of data patterns; and compare the selected new portion of the dataset with the selected new data pattern;

wherein executing logic to select the new portion of the dataset and select the new data pattern, comprises a subsequent iteration of the executing logic to select the new portion of the dataset and select the new data pattern based on a match that occurs between a previously selected different portion of the dataset and a previously selected different data pattern in a previous iteration of the executing logic to compare the previously selected different portion of the dataset with the previously selected different data pattern.

11. The computer system of claim 10, further comprising executing logic to:

store the plurality of data patterns in a tree data structure, in which each data pattern is stored in a respective node of the tree data structure; and wherein the subsequent iteration of the executing logic to select the new data pattern based on the match that occurs between the previously selected different portion of the dataset and the previously selected different data pattern in the previous iteration of the executing logic to compare the previously selected different portion of the dataset with the previously selected different data pattern, comprises the subsequent iteration of the executing logic to select a new data pattern stored in a child node of the tree data structure based on a match that occurs between a previously selected different portion of the dataset and a previously selected different data pattern stored in a parent node of the tree data structure, connected by an edge of the tree data structure to the child node, in a previous iteration of the executing logic to compare the previously selected different portion of the dataset with the previously selected different data pattern.

12. The computer system of claim 11, further comprising executing logic to:

generate the plurality of data patterns from one or both of a plurality of byte or character streams and a plurality of injected byte or character streams;

analyze the plurality of data patterns to identify a *nexus* between, or a sequence of, two or more data patterns and an informational value for each data pattern; and wherein executing logic to store the plurality of data patterns in the tree data structure, in which each data pattern is stored in a respective node of the tree data structure, comprises executing logic to store each pattern in a respective node of the tree data structure according to the *nexus* between, or the sequence of, two or more data patterns and the informational value for each data pattern, so that a data pattern with a higher informational value is stored in a node at a higher level in the tree data structure and connected by an edge to a node at a lower level in the tree data structure that stores a data pattern with a lower informational value, where the data pattern stored in the node at the higher level in the tree data structure has an identified *nexus*, or is in an identified sequence, with the data pattern stored in the node at the lower level in the tree data structure.

13. The computer system of claim 11, wherein iteratively executing logic to compare the selected new portion of the dataset with the selected new data pattern continues until one of an iteration of the executing logic occurs to select a new data pattern stored in a leaf node of the tree data structure, and a threshold number of matches occurs between the selected new portion of the dataset and the selected new data pattern over one or more iterations of the executing logic to compare the selected new portion of the dataset with the selected new data pattern.

14. The computer system of claim 10, wherein the executing logic to select the new portion of the dataset, comprises a subsequent iteration of the executing logic to select one of a previous new portion and a subsequent new portion of the dataset relative to the selected new portion of the dataset in a previous iteration of the executing logic to compare the selected new portion of the dataset with the selected new pattern based on the match that occurs between the previously selected different portion of the dataset and the previously selected different data pattern in the previous iteration of the executing logic to compare the previously selected different portion of the dataset with the previously selected different data pattern.

15. The computer system of claim 14, wherein the executing logic to select one of the previous new portion and the subsequent new portion of the dataset relative to the selected new portion of the dataset in the previous iteration, comprises executing logic to select one of a previous new portion and a subsequent new portion of the dataset that is located contiguous with or offset from the selected new portion of the dataset in the previous iteration.

16. The computer system of claim 11, wherein iteratively executing logic further comprises executing logic to add the selected new portion of the dataset to a second dataset in response to a match that occurs when executing logic to compare the selected new portion of the dataset with the selected new data pattern.

17. A non-transitory computer-readable medium storing computer-executable instructions that, when executed by one or more processors, cause the one or more processors to execute instructions, comprising:

iteratively executing logic to:

select a new portion of a dataset;

select a new data pattern from a plurality of data patterns; and compare the selected new portion of the dataset with the selected new data pattern;

wherein the executing logic to select the new portion of the dataset and select the new data pattern, comprises a subsequent iteration of the executing logic to select the new portion of the dataset and select the new data pattern based on a match that occurs between a previously selected different portion of the dataset and a previously selected different data pattern in a previous iteration of the executing logic to compare the previously selected different portion of the dataset with the previously selected different data pattern.

18. The non-transitory computer-readable medium of claim 17, further comprising executing logic to:

store the plurality of data patterns in a tree data structure, in which each data pattern is stored in a respective node of the tree data structure; and wherein the subsequent iteration of the executing logic to select the new data pattern based on the match that occurs between the previously selected different portion of the dataset and the previously selected different data pattern in the previous iteration of the executing logic to compare the previously selected different portion of the dataset with the previously selected different data pattern, comprises the subsequent iteration of the executing logic to select a new data pattern stored in a child node of the tree data structure based on a match that occurs between a previously selected different portion of the dataset and a previously selected different data pattern stored in a parent node of the tree data structure, connected by an edge of the tree data structure to the child node, in a previous iteration of the executing logic to compare the previously selected different portion of the dataset with the previously selected different data pattern.

19. The non-transitory computer-readable medium of claim 18, further comprising executing logic to:

generate the plurality of data patterns from one or both of a plurality of byte or character streams and a plurality of injected byte or character streams;

analyze the plurality of data patterns to identify a *nexus* between, or a sequence of, two or more data patterns and an informational value for each data pattern; and wherein executing logic to store the plurality of data patterns in the tree data structure, in which each data pattern is stored in a respective node of the tree data structure, comprises executing logic to store each pattern in a respective node of the tree data structure according to the *nexus* between, or the sequence of, two or more data patterns and the informational value for each data pattern, so that a data pattern with a higher informational value is stored in a node at a higher level in the tree data structure and connected by an edge to a node at a lower level in the tree data structure that stores a data pattern with a lower informational value, where the data pattern stored in the node at the higher level in the tree data structure has an identified *nexus*, or is in an identified sequence, with the data pattern stored in the node at the lower level in the tree data structure.

20. The non-transitory computer-readable medium of claim 18, wherein iteratively executing logic to compare the selected new portion of the dataset with the selected new data pattern continues until one of an iteration of the executing logic occurs to select a new data pattern stored in a leaf node of the tree data structure, and a threshold number of matches occurs between the selected new portion of the dataset and the selected new data pattern over one or more iterations of the executing logic to compare the selected new portion of the dataset with the selected new data pattern.

* * * * *